Dec. 31, 1935.  A. MADLÉ  2,026,283

VEHICLE TRANSMISSION MECHANISM

Filed June 8, 1934

INVENTOR.
Alain Madlé,
BY
ATTORNEY.

Patented Dec. 31, 1935

2,026,283

UNITED STATES PATENT OFFICE 2,026,283

VEHICLE TRANSMISSION MECHANISM

Alain Madlé, Bristol, Conn., assignor to
Edgar W. Bassick

Application June 8, 1934, Serial No. 729,575

10 Claims. (Cl. 180—43)

My present invention relates generally to improvements in that type of motor vehicle which utilizes the weight of the vehicle and its load for the purpose of creating a dynamic force which is applied to one or more of the traction wheels for facilitating their desired movement.

One feature of my invention relates broadly to such utilization of the weight of the vehicle and its load in connection with the wheels which are steered and where the front wheels are steered, more specifically, to the utilization of the weight of the vehicle and its load in association with front wheels which are driven and steered.

Another feature of my invention is the provision of an arrangement whereby the principle of the utilization of the vehicle and its load to create a dynamic force operable upon the wheels, independently of the motive force, is so attained as to develop a greater relative dynamic action than hitherto.

In vehicles utilizing the dynamic action of the weight of the vehicle and its load for the purposes referred to, it is the general practice to drive the wheel from a point well below the center thereof and to employ for this drive an axle arrangement which is correspondingly positioned with reference to the wheel centers. As a result of this arrangement, the live axle and other mechanism associated therewith, as for example, the differential, is positioned a substantial distance below the vehicle body and in close proximity to the ground, so that this axle and other parts present themselves as obstacles or abutments which become troublesome at times, particularly when the vehicle is driven over uneven roads; and I have found at times that the differential casing or the axle will strike against rocks or sudden ruts in the road because of the low position thereof.

A still further feature of my invention is the provision of an arrangement in a drive for a vehicle which utilizes the dynamic action of the weight and its load for applying it to the wheels, whereby, while the immediate driving elements for the wheel are located as hitherto, i. e., at a point well below the center of the wheel, the driving elements or mechanism therefor, which are usually positioned in between the wheels and extend from wheel to wheel, are positioned at a point which in its elevational position is independent of the location of the direct driving engagement of the wheels, and in the particular embodiment herein disclosed is positioned at a point well above the center of the wheels so as to present in between the wheels, a clearance for abnormal road conditions.

A further feature of my invention is the provision of an arrangement whereby a great deal of what has hitherto been the unsprung weight of the vehicle, and more particularly a great part of the driving mechanism, is shifted from its unsprung position to a sprung position, thereby decreasing the impacts against vehicle and road.

While I have illustrated all phases of my invention as associated with wheels utilizing the dynamic action of the vehicle frame and its load, it will be understood that, as to certain phases, my invention is not so limited, and therefore, unless specifically called for by the language of the claims, it will be understood that my invention is not so limited.

For the attainment of these objects and such other objects as may hereinafter appear or be pointed out, I have illustrated in the drawing embodiments of my invention, wherein.

Before proceeding to describe my invention, I will premise that the invention is particularly directed to a form of driving mechanism for the wheel of a road vehicle, such an an automobile or a truck, in which the vehicle frame is carried for swinging movement with reference to the wheels and in which the wheel drive is by a member in driving connection therewith and which member also swings with the vehicle about the axes of the wheels, and that this arrangement permits the vehicle, as it swings backwardly or forwardly about the axes of the wheels to apply to the wheel the dynamic action of its weight, so as to cause the wheel to meet any unusual resistance presented to it by road conditions or road obstacles.

For a further discussion of such dynamic action I may refer to U. S. patent to Domizi, No. 1,677,917, July 24, 1928, which shows a construction utilizing the same principle.

Figure 1:
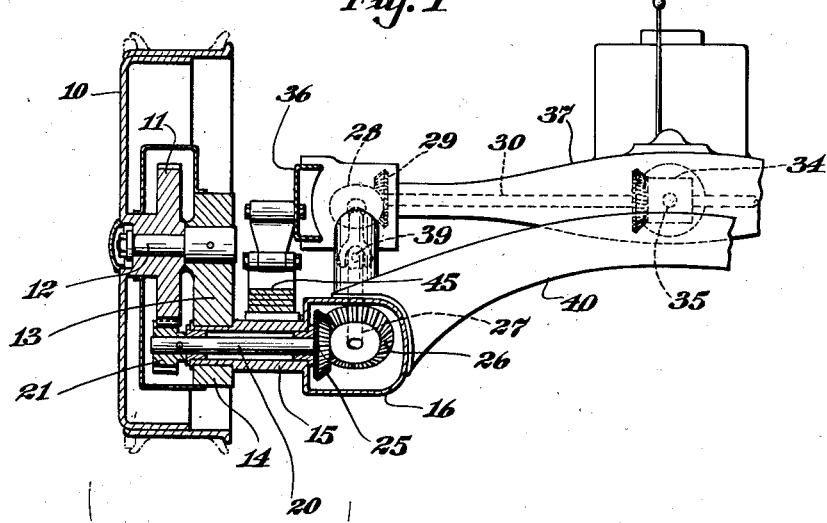
Figure 1 is a transverse section through one embodiment of my invention.

In Figure 1 of the drawing, I show the vehicle wheel 10 provided with the external gear 11 and mounted for rotation on the stub shaft 12. Carried from the stub shaft, for swinging movement about the axis of the gear 11, is a member 13 having an extension or crank portion 14 within which is rotatably carried the casing 15 having the enlarged chamber-like portion 16. Within the casing 15 is carried the jack shaft 20, having at its outer end the pinion 21 in mesh with the wheel gear 11 so as to establish an external driving connection between the two. At the inner end of the jack shaft 29 is carried the beveled gear 25 in mesh with the beveled gear 26, carried at one end of the shaft 27 which extends upwardly and forwardly with reference to the wheel. Carried at the inner end of this shaft 27 is the beveled gear 28 in mesh with the beveled gear 29 on the main jack shaft 30 which is driven from the differential 34, which in turn is driven from the main shaft 35.

The two opposite chambers or casing members 16 are connected by the cross member or beam 40.

Mounted upon each of the casings 15 is the spring support 45 for the vehicle frame 36. The differential casing or axle housing 37 is fastened at its opposite ends to the vehicle frame, thus forming the cross member for the frame. In this manner I carry the differential and its attendant driving mechanism from the vehicle frame and cause it to be sprung along with the frame, thus changing it from an unsprung weight to a sprung weight.

It will be observed that the arrangement above described gives the following general results: By re-arranging the drive as pointed out, I have been able to utilize the dynamic action of the weight of the vehicle in the general manner already known, without at the same time presenting connecting elements between the wheels suspended so low as to cause them to present serious obstacles to the vehicle drive when driving on uneven roads. It will be understood, of course, that while I have illustrated this as accomplished by running the drive from the wheel jack shafts forwardly and upwardly and in a direction generally lengthwise of the vehicle, this specific arrangement is not essential for the accomplishment of my results because any character of drive which will run from a point adjacent the wheels and in a direction upwardly toward the vehicle body will also accomplish this. Further, by carrying the driving mechanism from the vehicle itself rather than from the parts connecting the wheels, I have changed this driving mechanism from an unsprung weight to a sprung weight with its consequent advantages as to road and vehicle impacts.

It will be observed that the particular embodiment therein illustrated calls for the employment of a number of universal joints 39.

Attention is invited to the fact that the opposite wheels are not connected directly by any axle such as a dead axle which compels the wheels to move as a unit, and that therefore each wheel will respond to road conditions such as are presented to that particular wheel, and that therefore dynamic action will be applied to each wheel in accordance with its requirements and independently of the opposite wheel.

By using pinion 21 to drive an external gear 11, I have attained the result of increasing the velocity of the upward swinging movement of the pinion, without in any way changing the pinion or its position, over what it would be if the pinion were used to drive an internal gear, this latter being the customary construction. The dynamic action has been found to increase in arithmetical proportion to the decrease in the radius of the driven member 26, and with reference to the hammer blow that results, when one of the parts moving with the pinion strikes a stop, such as customarily used in constructions of this type, it is a fact that the dynamic action of this blow upon this stop is increased in proportion to the square of the decrease in the radius of the driven member. The great advantages afforded by the use of an external driven member as regards efficiency of action and flexibility of design will therefore be obvious.

Figure 2:
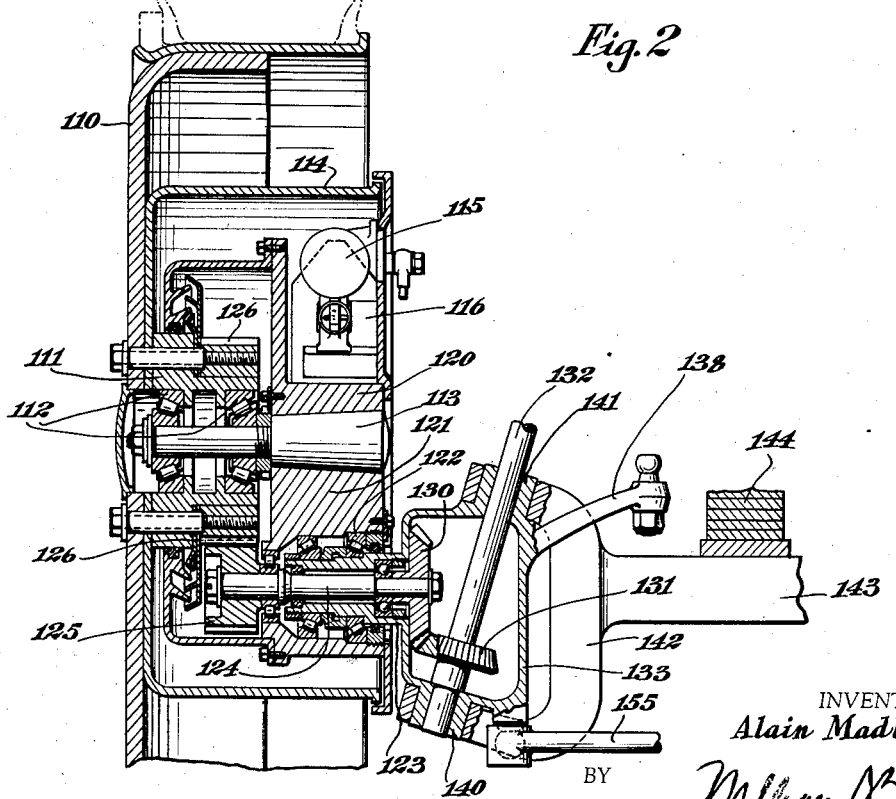
Figure 2 is a similar view through a further embodiment.

In the embodiment of Figure 2 I have illustrated a more or less conventional vehicle wheel 110 mounted upon a hub 111 having a bearing support 112 from the stub shaft 113. In connection with the stub shaft, it will be understood that each of the four wheels of the vehicle has a stub shaft of its own and that there is no connection between the stub shafts of the opposed wheels, except through the differential, where one is used, so that each of the wheels may move independently of the other, both as to rotation in either direction relatively to each other, and as to any swinging movement each wheel may have. The importance of this arrangement will be understood both from the standpoint of the action of the two front wheels or the two rear wheels, where one of the front wheels or one of the rear wheels meets an obstruction, in which event the utilization of the dynamic action of the vehicle and the load will be concentrated wholly upon that one wheel and will not be retarded by the other wheel, and the other wheel will maintain its normal position.

It will also be understood that, in connection with the vehicle as a whole, the employment of this dynamic action of the vehicle and its load in connection with the front wheels, as well as in connection with the rear wheels, has the result that, should the front wheels meet an obstruction, the dynamic action is applied to them and to the degree to which they are obstructed. Where all four wheels meet with an obstruction or increased resistance, as for instance when buried in sand or gravel, not only will the resistance created by the front wheels be taken off the rear wheels, but the front wheels will also have the dynamic action applied to them so as to assist and not to retard the forward or rearward movement of the truck.

Furthermore, it will be understood that in the case where the utilization of a dynamic action of the vehicle and the load is applied only to two of the wheels, as for example, the rear wheels, that this dynamic action which depends upon the ability of the vehicle and the load to move forward relatively to the wheels when the wheels stop, will be counteracted to a great extent, if not wholly, by the rigid connection between the other wheels and the vehicle, where my invention is not employed. On the other hand, when the phase of my invention now being discussed is employed, not only will this tendency to resist the dynamic action not be present but to the contrary, the dynamic action will also be applied to the front wheels so that the vehicle and the load, when the wheels are buried in sand for example, will apply their dynamic action to all four wheels at one time. And in fact, the dynamic action is increased when so applied.

As a further result of the fact that the two front wheels are not directly connected, and particularly where such feature is employed along with the utilization of the dynamic action of the vehicle and the load, I have found that this independent movement of the wheels which is permitted by this arrangement absolutely eliminates all possibility of shimmying due to unequal action upon the wheels by obstructions or road conditions, and also I have found it permits of a much shorter radius in the turning of the wheels.

114 shows the brake drum, and 115 the cylinder of a conventional hydraulic brake-applying means. 116 shows the conventional brake shoe.

The construction thus far described might be termed a more or less conventional wheel structure for an automobile or a truck except insofar as each wheel is carried by its own stub shaft 113, the importance of which has already been generally referred to and will be more particularly referred to hereinafter.

Fixed to the stub shaft 113 which is freely rotatable relatively to the wheel 110 through the bearing mounting 112, is the member 120 having the extending portion or skirt 121 in which is carried the mechanism for applying the dynamic action which I will now describe. While reference will be made in such description to the drive for driving, it will be understood that such drive is not essential in connection with the application of the dynamic action.

Mounted in this lower portion 121 by means of the bearings 122 is the casing 123 within which is received the jack shaft 124 having at its outer end the member 125 for driving the wheel 110, which, in the embodiment illustrated, takes the form of a pinion which meshes with the gear 126 carried by the wheel. It will be observed that the driving connection between the jack shaft 124 and the wheel is an external one i. e., a driving engagement between members exterior of each other. As this is one of the features of my invention, further reference will be made thereto hereinafter.

At the end of the jack shaft 124 opposite from that upon which the pinion 125 is carried, is a driving connection with the main drive which in the case illustrated is in the form of a beveled gear 130 in engagement with a beveled gear 131 mounted on a driving shaft 132 carried in a casing 133 which, in fact, in the embodiment illustrated, is nothing more than a widened portion of the casing 123. The employment of a driving connection between the shafts 124 and 132 such as the crown wheels 130 and 131 permits the casing 133 to swing with the swinging member 120 relatively to the axis of the wheel without thereby disconnecting the drive. While I have illustrated this as attained by the employment of the beveled wheels, it will be understood that any other character of drive can be employed which will give this result.

Fixed to the casing 133 is the steering arm 138 of the steering mechanism (not shown). The oppositely extending bearings 140 and 141 receive thereabout the legs of the support 142 associated with each of the casings 133 attached to the wheels, and these supports 142 are carried by the axle 143 upon which is mounted the vehicle (not shown) as by vehicle springs 144. The member 143 is, in fact, nothing more than a cross member of the frame of the vehicle itself, and can form part of the chassis although preferably from engineering practice, the spring connection 144 might be positioned in between the vehicle proper and the beam support 143. It will be understood, of course, that while I describe this beam as extending all the way across from the casing 133 on one side to the corresponding casing on the opposite side, this is not essential, and it will be understood that while the springs 144 are carried from this beam, the purposes of my invention will be carried out as well if the spring were carried directly by the support 142 in any preferred or desired manner.

I will now explain the mode of operation of the mechanism above described. The shaft 132 will drive the jack shaft 124 through the beveled gears 130 and 131 which in turn will drive the pinion 125 which is in mesh with the gear 126 carried by the wheel. The two factors that determine the position of the pinion 125 with reference to the vertical gear 126 are (1) the resistance offered to the movement of wheel as against (2) the action of the weight of the vehicle and its load. The tendency of the pinion will be to ride upwardly on the gear until a point has been reached where the vehicle and its load taken in connection with the power applied from the engine will cause the pinion to drive the gear, at which time the driving action of the vehicle would be effected. Where there is any increased resistance to the vehicle as a whole the pinion will tend to assume a little higher angular position until the driving relation has been established.

By positioning the driving element 125 outside of the driven member 126 as herein disclosed, I have attained the result of increasing the velocity of the upward swinging movement of the pinion without in any way changing the pinion or its position, so that in effect, this dynamic action is increased in arithmetical proportion to the decrease in the radius of the driven member 26 and with reference to the hammer blow that results, as herebelow pointed out, when one of the parts moving with the pinion strikes a stop, as hereinafter described. It is a fact that the dynamic action of this blow upon this stop is increased by the square of the decrease in the radius of the driven member.

Fixed to the swinging member 121 are the end stops (not shown) to engage stops (not shown) carried by the casing 133. I have found that the action of this blow can be slightly cushioned by making the casing stops in the form of elastic or spring members of any desired character.

The casing 133 forms what I might term the king pin of the steering apparatus, and is connected to the corresponding casing 133 on the opposed wheel by the equalizing bar 155 which controls the coordination of the steering of both wheels.

While I have above described my manner of associating with either the front or the rear wheels or with both, an apparatus in which such wheels not only utilize the dynamic action of the vehicle and its load as already set forth, but also have coordinately associated therewith the steering and driving apparatus so as to permit the employment of such wheels with a front wheel drive, with a rear wheel drive in which the rear wheels are steered, or with a four wheel drive in which all four wheels are steered, yet, it will be understood that the driving connection may be broken at any point between the shaft 132 and the wheel gear 126, as for example, by disconnecting or removing the crown wheels 130 or by substituting for them or for the gear and pinion connection 125 and 126 a non-driving association, and that such construction can then be used in connection with any wheels which are to be steered only and not driven, as for example, in connection with the front wheels of an automobile or truck, in which the front wheels are not driven. It will be understood that the above mentioned driving connection is for the purposes of giving my invention additional functions and additional utilities.

While in each embodiment I have illustrated but one wheel, it will be understood that the corresponding wheel to the opposite side is a duplication thereof, and its illustration and description would be mere duplication. This is true also where in either embodiment the wheel construction illustrated is duplicated in all four wheels.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is:

1. In a device of the character described, in combination, a traction wheel, means carried by the wheel for free swinging movement about the axis thereof, said means comprising a driving element mounted eccentrically of said axis, wheel steering apparatus, and supporting means for a vehicle body, the steering apparatus and the supporting means being mounted to move with the driving element angularly with reference to the axis of the wheel as said driving element swings about said axis.

2. In a device of the character described, in combination, a traction wheel, an assembly mounted eccentrically to swing as a unit about the axis of rotation of said traction wheel, said assembly comprising a steering knuckle for the wheel and rotating means for driving the wheel and mounted with relation to the steering knuckle so as to swing bodily about the axis of the wheel along with the steering knuckle, said assembly further comprising the supports for the vehicle body, whereby a dynamic action on the wheel results as the assembly swings about the wheel.

3. In a device of the character described, in combination, a traction wheel having a concentric gear, a mounting supported for swinging movement about the axis of said gear, a casing carried by said mounting eccentrically of such axis, a pinion in mesh with said gear, a jack shaft, bevel wheels within said casing for driving said pinion from said jack shaft, a steering apparatus connected to said casing, the casing serving as the steering knuckle and king pin of said steering apparatus.

4. In a device of the character described, in combination, a traction wheel, a mounting associated with the wheel, for rotation about the axis thereof, a driving member for the wheel carried by the mounting associated therewith and eccentrically of its axis, means for driving the member, said means permitting of a swinging movement of the driving means without breaking the driving connection, a casing for said means and steering apparatus connected to said casing, and vehicle body carrying means associated with said casing.

5. A transmission mechanism for motor vehicles, comprising a traction wheel, an axle about which the wheel rotates, an external driven gear fixed to said wheel, said drive comprising a mounting supported for free swinging movement about the axle of the wheel, and a driving gear carried by said mounting eccentrically of the axis of the wheel and in driving engagement with said external driven gear, a shaft rotatably carried by said mounting and carrying said driving gear at its outer end, and means for driving said shaft from the motive power of the vehicle, whereby, in the application of the dynamic action of the vehicle and its load to the wheel, the velocity of the linear movement of said driving gear and its mounting in response to an increase either in the resistance to the movement of the wheel or in the motive power applied, will be greater than that of an internal drive, and the resulting dynamic action of the vehicle and the load will be greater.

6. In an automotive vehicle having front road wheels and rear road wheels, a mounting associated with each wheel and adapted to swing about the axis thereof, means associated with each mounting eccentrically of the axis thereof for carrying the vehicle and its load, whereby the dynamic action of the vehicle and its load can be applied to all of said wheels, means carried by and movable with the mountings on the front wheels for steering the front wheels, and means carried by and movable with the mountings on said front wheels for driving said wheels.

7. In an automotive vehicle having front road wheels and rear road wheels, each mounted to rotate about its own independent axis, a mounting associated with each wheel and adapted to swing about the axis thereof, means associated with each mounting eccentrically of the axis thereof for carrying the vehicle and its load, whereby the dynamic action of the vehicle and its load can be applied to all of said wheels, means carried by and movable with the mountings on the front wheels for steering the front wheels, and means carried by and movable with the mountings on said front wheels for driving said wheels.

8. In an automotive vehicle having paired vehicle wheels, a mounting carried by each wheel for swinging movement about the axis thereof, means carried by each mounting for driving its associated wheel, and a cross drive mounted in a plane above that of said driving means, whereby the road clearance between the wheels is increased, said cross drive being also carried for swinging movement with the mountings.

9. In an automotive device having paired vehicle wheels, driving means for each wheel positioned adjacent thereto comprising a cross drive therefor located above the plane of the driving means, spring means for supporting the vehicle and its load, the cross drive being carried from said spring means, whereby the cross drive is made part of the spring weight and the road clearance between the wheels is increased.

10. A device of the character described having in combination a traction wheel, an external gear associated therewith for imparting motion thereto, a member mounted so as to pivot about the axis of said wheel, a casing journalled within said member, said casing mounted in a supporting member so as to pivot about an axis angularly disposed with relation to the axis of the wheel, a driven shaft journalled within said casing and carrying a pinion in mesh with said external gear, and means rotatable coaxially with the pivot of said casing carried by said casing and adapted to rotate said drive shaft, and resilient means intermediate the vehicle body and said supporting member.

ALAIN MADLÉ.